(12) United States Patent  
Buehler

(10) Patent No.: US 9,407,878 B2  
(45) Date of Patent: *Aug. 2, 2016

(54) OBJECT TRACKING AND ALERTS

(71) Applicant: Sensormatic Electronics, LLC, Westminister, MA (US)

(72) Inventor: Christopher J. Buehler, Cambridge, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,358

(22) Filed: Apr. 15, 2015

(65) Prior Publication Data

US 2015/0244992 A1 Aug. 27, 2015

Related U.S. Application Data

(63) Continuation of application No. 11/443,500, filed on May 30, 2006, now Pat. No. 9,036,028.

(60) Provisional application No. 60/714,020, filed on Sep. 2, 2005, provisional application No. 60/713,679, filed on Sep. 2, 2005.

(51) Int. Cl.
*H04N 7/18* (2006.01)
*G08B 13/196* (2006.01)
*G08B 13/24* (2006.01)
*H04N 17/00* (2006.01)

(52) U.S. Cl.
CPC .......... *H04N 7/181* (2013.01); *G08B 13/19602* (2013.01); *G08B 13/19608* (2013.01); *G08B 13/19641* (2013.01); *G08B 13/19671* (2013.01); *G08B 13/19691* (2013.01); *G08B 13/19697* (2013.01); *G08B 13/248* (2013.01); *H04N 17/002* (2013.01)

(58) Field of Classification Search
CPC ......... H04N 7/18; H04N 7/181; H04N 17/00; H04N 17/002; G06T 7/2093
See application file for complete search history.

(56) References Cited

U.S. PATENT DOCUMENTS 3,740,466 A 6/1973 Marshall et al.
4,511,886 A 4/1985 Rodriguez (Continued)

FOREIGN PATENT DOCUMENTS

EP 0 529 317 A1 3/1993
EP 0 714 081 A1 5/1996

(Continued)

OTHER PUBLICATIONS

Author unknown. "The Future of Security Systems" retrieved from the internet on May 24, 2005, http://www.activeye.com/; http://www.activeye.com/act_alert.htm; http://www.activeye.com/tech.htm; http://www.activeye.com/ae_team.htm; 7 pages.

(Continued)

*Primary Examiner* — Farzana Hossain
*Assistant Examiner* — Christopher Findley
(74) *Attorney, Agent, or Firm* — Goodwin Procter LLP

(57) ABSTRACT

An integrated surveillance system combining video surveillance and data from other sensor-based security networks is used to identify activities that may require attention.

20 Claims, 6 Drawing Sheets

(56) References Cited

U.S. PATENT DOCUMENTS

| | | | |
|---|---|---|---|
| 4,737,847 A | 4/1988 | Araki et al. |
| 4,991,008 A | 2/1991 | Nama |
| 5,097,328 A | 3/1992 | Boyette |
| 5,164,827 A | 11/1992 | Paff |
| 5,179,441 A | 1/1993 | Anderson et al. |
| 5,216,502 A | 6/1993 | Katz |
| 5,237,408 A | 8/1993 | Blum et al. |
| 5,243,418 A | 9/1993 | Kuno et al. |
| 5,298,697 A | 3/1994 | Suzuki et al. |
| 5,305,390 A | 4/1994 | Frey et al. |
| 5,317,394 A | 5/1994 | Hale et al. |
| 5,581,625 A | 12/1996 | Connell |
| 5,666,157 A | 9/1997 | Aviv |
| 5,699,444 A | 12/1997 | Palm |
| 5,708,423 A | 1/1998 | Ghaffari et al. |
| 5,729,471 A | 3/1998 | Jain et al. |
| 5,734,737 A | 3/1998 | Chang et al. |
| 5,745,126 A | 4/1998 | Jain et al. |
| 5,920,338 A | 7/1999 | Katz |
| 5,956,081 A | 9/1999 | Katz et al. |
| 5,969,755 A | 10/1999 | Courtney |
| 5,973,732 A | 10/1999 | Guthrie |
| 6,002,995 A | 12/1999 | Suzuki et al. |
| 6,028,626 A | 2/2000 | Aviv |
| 6,049,363 A | 4/2000 | Courtney et al. |
| 6,061,088 A | 5/2000 | Khosravi et al. |
| 6,069,655 A | 5/2000 | Seeley et al. |
| 6,075,560 A | 6/2000 | Katz |
| 6,097,429 A | 8/2000 | Seeley et al. |
| 6,185,314 B1 | 2/2001 | Crabtree et al. |
| 6,237,647 B1 | 5/2001 | Pong et al. |
| 6,285,746 B1 | 9/2001 | Duran et al. |
| 6,295,367 B1 | 9/2001 | Crabtree et al. |
| 6,359,647 B1 | 3/2002 | Sengupta et al. |
| 6,396,535 B1 | 5/2002 | Waters |
| 6,400,830 B1 | 6/2002 | Christian et al. |
| 6,400,831 B2 | 6/2002 | Lee et al. |
| 6,437,819 B1 | 8/2002 | Loveland |
| 6,442,476 B1 | 8/2002 | Poropat |
| 6,456,320 B2 | 9/2002 | Kuwano et al. |
| 6,456,730 B1 | 9/2002 | Taniguchi |
| 6,483,935 B1 | 11/2002 | Rostami et al. |
| 6,502,082 B1 | 12/2002 | Toyama et al. |
| 6,516,090 B1 | 2/2003 | Lennon et al. |
| 6,522,787 B1 | 2/2003 | Kumar et al. |
| 6,526,156 B1 | 2/2003 | Black et al. |
| 6,549,643 B1 | 4/2003 | Toklu et al. |
| 6,549,660 B1 | 4/2003 | Lipson et al. |
| 6,574,353 B1 | 6/2003 | Schoepflin et al. |
| 6,580,821 B1 | 6/2003 | Roy |
| 6,591,005 B1 | 7/2003 | Gallagher |
| 6,698,021 B1 | 2/2004 | Amini et al. |
| 6,791,603 B2 | 9/2004 | Lazo et al. |
| 6,798,445 B1 | 9/2004 | Brumitt et al. |
| 6,813,372 B2 | 11/2004 | Standridge et al. |
| 7,116,353 B2 | 10/2006 | Hobson et al. |
| 7,245,221 B2 | 7/2007 | Claudatos et al. |
| 7,286,158 B1 | 10/2007 | Griebenow |
| 7,551,089 B2 | 6/2009 | Sawyer |
| 2001/0032118 A1 | 10/2001 | Carter |
| 2003/0025800 A1 | 2/2003 | Hunter et al. |
| 2003/0040815 A1 | 2/2003 | Pavlidis |
| 2003/0053658 A1 | 3/2003 | Pavlidis |
| 2003/0058111 A1 | 3/2003 | Lee et al. |
| 2003/0058237 A1 | 3/2003 | Lee |
| 2003/0058341 A1 | 3/2003 | Brodsky et al. |
| 2003/0058342 A1 | 3/2003 | Trajkovic |
| 2003/0071891 A1 | 4/2003 | Geng |
| 2003/0103139 A1 | 6/2003 | Pretzer et al. |
| 2003/0123703 A1 | 7/2003 | Pavlidis et al. |
| 2003/0197612 A1 | 10/2003 | Tanaka et al. |
| 2004/0130620 A1 | 7/2004 | Buehler et al. |
| 2004/0155960 A1 | 8/2004 | Wren et al. |
| 2004/0160317 A1 | 8/2004 | McKeown et al. |
| 2004/0164858 A1 | 8/2004 | Lin |
| 2004/0194129 A1 | 9/2004 | Carlbom et al. |
| 2004/0249848 A1 | 12/2004 | Carlbom et al. |
| 2004/0252197 A1 | 12/2004 | Fraley et al. |
| 2005/0017071 A1 | 1/2005 | Noonan |
| 2005/0073418 A1 | 4/2005 | Kelliher et al. |
| 2005/0078006 A1 | 4/2005 | Hutchins et al. |
| 2005/0102183 A1 | 5/2005 | Kelliher et al. |
| 2006/0243798 A1* | 11/2006 | Kundu .................. G06Q 20/00 235/383 |
| 2007/0057049 A9 | 3/2007 | Kundu et al. |
| 2007/0164845 A1 | 7/2007 | Ivins et al. |
| 2008/0303902 A1 | 12/2008 | Romer et al. |

FOREIGN PATENT DOCUMENTS

| | | |
|---|---|---|
| EP | 0 967 584 A2 | 12/1999 |
| EP | 1 189 187 A2 | 3/2002 |
| JP | 8011071 A | 1/1996 |
| JP | 2005-11057 | 1/2005 |
| WO | WO-97/04428 A1 | 2/1997 |
| WO | WO-01/46923 A1 | 6/2001 |
| WO | WO-01/82626 A1 | 11/2001 |
| WO | WO-03/044727 A1 | 5/2003 |
| WO | WO-2004/034347 A1 | 4/2004 |

OTHER PUBLICATIONS

Chang, et al., (2001) "Tracking Multiple People with a Multi-Camera System," *IEEE*, pp. 19-26.

International Search Report for International Patent Application No. PCT/US03/35943 dated Apr. 13, 2004.

International Search Report and Written Opinion for International Patent Application No. PCT/US04/29417 dated Apr. 8, 2005.

International Search Report and Written Opinion for International Patent Application No. PCT/US04/29418 dated Feb. 28, 2005.

International Search Report and Written Opinon for International Patent Application No. PCT/US04/033168 dated Feb. 25, 2005.

International Search Report and Written Opinion for International Patent Application No. PCT/US04/033177 dated Dec. 12, 2005.

International Search Report and Written Opinion for International Patent Application No. PCT/US06/021087 dated Oct. 19, 2006.

International Search Report and Written Opinion for International Patent Application No. PCT/US08/07223 dated Dec. 23, 2008, 6 pages.

International Preliminary Report on Patentability for International Patent Application No. PCT/US04/029417 dated Mar. 13, 2006.

International Preliminary Report on Patentability for International Patent Application No. PCT/US04/033168 dated Apr. 10, 2006.

International Preliminary Report on Patentability for International Patent Application No. PCT/US04/033177 dated Apr. 10, 2006.

Khan, et al., (2001) "Human Tracking in Multiple Cameras," *IEEE*, pp. 331-336.

Official Action for Japanese Application No. 2008-529,008 dated Sep. 6, 2011, 3 pages.

* cited by examiner

OBJECT TRACKING AND ALERTS

CROSS-REFERENCE TO RELATED APPLICATIONS

This application is a continuation of U.S. patent application Ser. No. 11/443,500, filed on May 30, 2006, and entitled "Object Tracking and Alerts," which claims priority to U.S. Provisional Patent Application Nos. 60/713,679 and 60/714,020, both filed on Sep. 2, 2005, the entireties of which are incorporated by reference herein.

TECHNICAL FIELD

This invention relates to computer-based methods and systems for surveillance, and more specifically to a computer-aided surveillance system capable of tracking objects and triggering alerts using multiple surveillance modalities.

BACKGROUND INFORMATION

The current heightened sense of security and declining cost of monitoring equipment have resulted in increased use of surveillance systems using technologies such as closed-circuit television (CCTV). Such systems have the potential to reduce crime, prevent accidents, and generally increase security in a wide variety of environments. Video surveillance systems typically include a series of cameras placed in various locations about an area of interest (e.g., a warehouse, a retail establishment, an office building, or an airport, for example). The cameras transmit video feeds back to a central viewing station (or multiple stations), typically manned by a security officer. The various surveillance feeds are displayed on a series of screens, which are monitored for suspicious activities.

Areas that are monitored with video surveillance systems often have other sensor networks available for monitoring other aspects of the environment. For example, many installations have electronic doors that report who opens them (using, for example, a "smart-card" reader system) or radio-frequency identification (RFID) systems that report when a particular object enters or leaves an area. In particular, retail stores often have a variety of data networks available in addition to video surveillance systems. Point-of-sale (POS) systems, for example, record when purchases are made, when cash drawers are opened, when returns are made, and when coupons are redeemed, among other events that can occur at a checkout or purchase area. As another example, electronic article surveillance (EAS) systems placed at exits register EAS tags as they exit the store, and generate events (either silent, audible, or both). Inventory control systems using bar-code scanning, shelf-scanning, and other techniques are also common in such environments. In addition to video surveillance, RFID systems have become increasingly popular for tracking people and/or objects throughout facilities such as office buildings, warehouses and retail establishments.

Implementing and integrating video surveillance and RFID tracking systems, POS systems, and other tracking modalities involves numerous challenges. Initially, the cameras, transmitters and other data-capture devices must be placed such that they achieve the goals outlined for the system, e.g., product tracking, theft prevention, personnel management, or some combination thereof. Often, however, the physical layout of the monitored environment does not lend itself to complete coverage. For example, small, rarely used rooms, hidden hallways, or other locations not within direct visual sight of a camera or that do not have high product traffic may be left unmonitored. This may be due to limited funds, physical characteristics of the building (walls, columns, etc.), the limited ability to monitor multiple video streams, and other restrictions. In addition, malfunctioning equipment may create temporary "dead zones" that are not covered. Unfortunately, individuals likely to attempt to misappropriate merchandise (disgruntled employees, habitual shoplifters, etc.) may be aware of the uncovered areas, and use them to advance their thefts.

In addition to the challenges relating to theft, merchandisers struggle to accurately track products as they travel about a facility. For example, most RFID implementations are limited to inventory control points such as loading docks and warehouse shelves. However, once a product leaves the "back room" and is shelved for sale, retailers lose track of the products until they "reappear" at a point-of-sale device such as a cash register or scanner. This inability to track a product from its point of entry (e.g., a loading dock) through the ultimate exit point from the facility (customer exit, shipping dock, etc.) represents a significant under utilization of RFID capability.

Current attempts to combine video surveillance systems with data from other tracking systems have not provided comprehensive, adaptive solutions that address these limitations, and most still require significant human interaction to monitor and/or coordinate the two systems. Conventional systems that attempt combine video surveillance with data from other, non-video tracking systems typically rely on a strong association (e.g., 1:1) between devices (e.g., RFID transmitters) and cameras. Although useful for purposes where limited activity is expected (intruders into otherwise restricted areas, for example), such systems cannot effectively identify and track objects in busy environments. POS applications are typically limited to cash registers located at specific check-out locations within a store. Furthermore, most video surveillance systems require some form of human interaction to positively identify subjects as they traverse the facility and move from one camera to another and to detect anomalies (e.g., suspicious behavior, missing merchandise, etc.) that prompt action. RFID transmitters generally have an effective radius that is significantly smaller than a camera's field of view, while typical video surveillance systems attempt to minimize implementation costs (and monitoring burdens) by using as few cameras as possible for a given coverage area. In retail and casino implementations, for example, this can result in dozens of people and potentially hundreds of products being within a camera's view at a given time.

Furthermore, for tracking information (whether video, RFID, and/or POS) to be used as evidence of illegal or suspicious activities (e.g., intruders, potential shoplifters, etc.), it must meet additional authentication, continuity and documentation criteria to be relied upon in legal proceedings. Tracking information that is properly annotated with date, time, and location information, and which can show a continuous stream of activity without temporal or spatial interruptions, is much more valuable as evidence than a series of non-contiguous, unmarked segments.

SUMMARY

The invention generally provides for an integrated surveillance system that combines an intelligent video surveillance system with data from other sensor-based security networks. Using the combined video and sensor-based network data, alerts can be generated highlighting suspicious activities that may require attention. For example, combining data from RFID, POS, and/or EAS systems with data from a computer-aided video surveillance system can greatly increase the system's accuracy in identifying suspicious behavior. Such an "intelligent" alert system therefore has a lower false-positive rate than each system alone, while also lowering personnel training costs, minimizing missed events, and thus increasing the overall value of the system.

For example, video images and location-specific data (based, for example, on RFID) can be utilized to create a complete "timeline" tracking the passage of an object and/or person through a monitored area. Relationships between location sensors and regions within the video images are determined, either explicitly or through inferential analysis of the two resulting data sets. In cases where so-called "dead-zones" exist within a monitored environment, current and future positions of the objects and/or people can be predicted using relationships among the cameras, the RFID transmitters, and through analysis of historical data. Rules regarding the paths, positions, and/or behavior of tracked objects are defined, and when triggered, these rules initiate alarms indicating unwanted or suspicious behavior. The alarms can, for example, be transmitted via wireless communication to hand-held receivers (augmented with other spatial and/or geographic information in some cases) used by security personnel as they patrol the monitored environment.

Accordingly, in a first aspect, the invention provides a system for generating alerts based on events in an environment. The system includes cameras that produce video signals representing at least a portion of an environment and a video-processing module for analyzing the video signals and identifying objects within the environment. The system also includes a data-input module for receiving non-video data from a sensor-based monitoring system (the data representing events within the environment), and an alert module for generating alerts based on the identified object and event.

The sensor-based monitoring system can be, for example, a POS system, an RFID system, and/or an EAS system. In some embodiments, the system also includes a data-storage module for storing rules relating to activity within the environment. The rules relate to objects identified in the video data, events detected from the sensor-based monitoring system, or both. In some cases, the absence of an object and/or an event can trigger an alarm. The system can also include a communications module for transmitting the generated alerts to remote devices such as workstations and wireless hand-held devices. In some embodiments, the system also includes a geographic information services module for rendering visual representations of the environment, which can include representations of the objects being tracked, their current location, direction and velocity of movement and status, and can be annotated with color, text, or other visual indicators of location, status and movement.

In another aspect, the invention provides a method for detecting conditions within a environment. The method includes receiving image signals representing at least a portion of the environment and identifying objects represented within the image signals. The method also includes receiving non-video data representing events occurring in the environment and generating an alert based on the identified objects and the events.

The image signals can be received, for example, from cameras placed about the monitored environment, and in some cases the objects within the environment are people. In some embodiments, the non-video data is received from POS system, an RFID system, or in some cases, both. The alerts can be based, for example, on an object and/or an event (or the absence thereof) violating a rule relating to activity within the environment. A geographical representation of the environment can be created that, in some cases, includes representations of the tracked objects. Such representation can then be transmitted to remote devices such as workstations and hand-held wireless devices, for example, and can include various annotations relating to the status and movement of the objects.

In another aspect, the invention provides a surveillance system including a video surveillance subsystem, a radio-frequency identification subsystem (which may, in some embodiments, be calibrated independently of the video subsystem) and an association module. The video surveillance subsystem includes a number of cameras and each camera's field of view includes multiple camera sub-regions. The RFID subsystem includes stations that detect the presence of RFID identification tags within some operational radius. The association module, based on data received from the two subsystems, creates an association between the camera sub-regions and the operational radii of the stations.

The associations can be based, for example, on locational correspondences between the camera sub-regions and the operational radii, and in some embodiments may be inferred from data captured by the video surveillance subsystem, the RFID subsystem, or both. Data captured by the video surveillance subsystem can include visual representations of objects moving among the cameras and/or the sub-regions of the cameras. Data captured by the RFID subsystem can include time and spatial information associated with objects moving among the stations.

In some embodiments, the system includes a data storage module for storing information associated with objects being tracked by the surveillance system, including, in some cases, rules relating to the objects. The system can also include a tracking module for creating a chronological representation of the locations of the objects based on data from the video surveillance subsystem and the RFID subsystem. In some embodiments, the video surveillance subsystem and RFID subsystem operate within a region that includes one or more ineffective areas in which neither the video surveillance subsystem nor the RFID subsystem can "see" an object. In such cases, the location (or future location) of the unseen object can be inferred by the tracking module using, for example, historical data such as a previously known location of the object or paths taken by similar objects, based, in part, on data received from the RFID subsystem.

Some embodiments of the surveillance system include an alarm module that applies rules (stored, for example, in the data storage module) to data received from the tracking module, such as the chronological representations of the locations of the tracked objects. If a rule is violated, the alarm module may create an alert which can be transmitted (via, for example, wireless transmission) to a communication device, thereby alerting its operator of the alarm. In some embodiments, the alert module instructs cameras to focus on an object, area and/or person of interest.

In another aspect, the invention provides a method for monitoring activity within a monitored environment. The method includes receiving video signals generated by cameras, each of which has a field of view including multiple of sub-regions; receiving data from RFID stations based on interaction with RFID tags associated with objects within the monitored environment; associating the camera sub-regions with the operational radii of the RFID stations, and tracking, independent of calibration, objects as they move between fields of view of the cameras and the operational radii of the RFID stations within the monitored environment.

The associations can be based, for example, on locational correspondences between the camera sub-regions and the operational radii, and in some embodiments may be inferred from data captured by the video surveillance subsystem, the RFID subsystem, or both. Data captured by the video surveillance subsystem can include visual representations of objects moving among the cameras and/or the sub-regions of the cameras. Data captured by the RFID subsystem can include spatial information associated with objects moving among the stations.

In some embodiments, the method further includes chronologically representing the locations of object within the environment based on the video signals and data generated by the RFID stations. In cases where the objects pass through an area not covered by the cameras or the RFID stations, the current and/or future location of the objects can be inferred based on the received data, which may, in some cases, include a previously known location of the object.

In some embodiments, the chonological representations of the object locations are assessed against rules regarding the objects, and in some cases, alerts generated when one or more of the rules are violated. The alerts can then be transmitted (via, for example, wireless communication protocols) to wireless devices, thereby alerting a surveillance officer. In some embodiments, the alerts can also be used to instruct cameras to focus on an object, area and/or person of interest.

In another aspect, the invention comprises an article of manufacture having a computer-readable medium with the computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM. The functionality of the techniques may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC). The data, rules, and data structures can be stored in one or more databases for use in performing the methods described above.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Although described herein with reference to tracking patrons and products within retail establishments, and as useful when implemented with regard to detecting theft, the systems and methods described below are applicable to any environment being monitored, such as airports, casinos, schools, office buildings and activities that may occur therein for a wide range of purposes.

Figure 1:
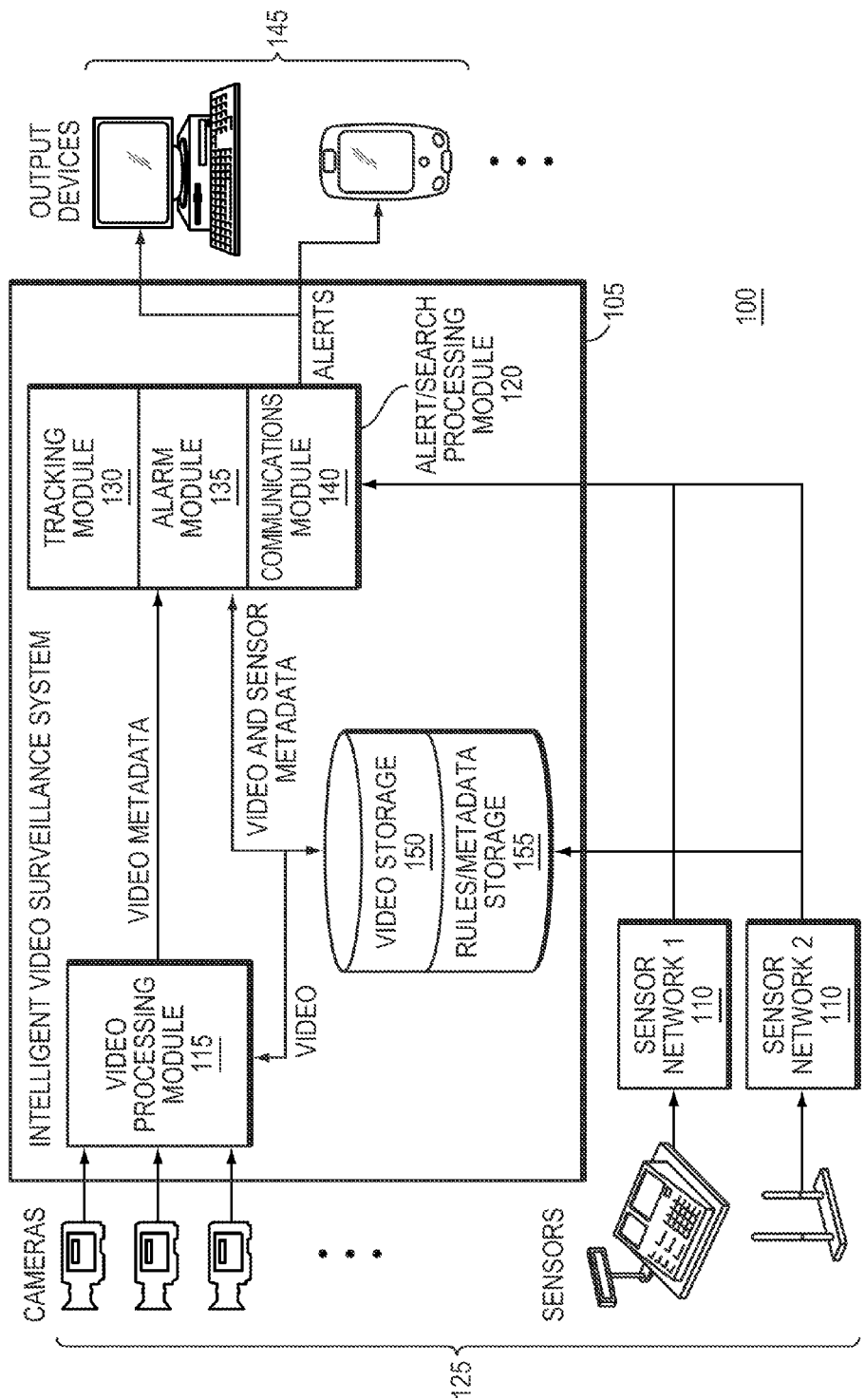
FIG. 1 is a block diagram of an embodiment of a surveillance system incorporating data from multiple sensor networks according to one embodiment of the invention.

FIG. 1 illustrates an integrated video surveillance and sensor network system 100 in accordance with the invention. The system broadly includes an intelligent video surveillance system 105 and one or more external sensor networks 110. The intelligent video surveillance system 105 includes a video processing module 115 and an alert/search processing module 120. The video processing module 115 analyzes video streams, producing compressed video and video meta-data as outputs. In some embodiments, the alert/search processing module 120 includes a tracking module 130, an alarm module 135 and a communications module 140 and scans video metadata for patterns that match a set of predefined rules, producing alerts (or search results, in the case of prerecorded metadata) when pattern matches are found which can then be transmitted to one or more output devices 145 (described in greater detail below). Examples of metadata used by the alarm module when processing the rules include object IDs, object type (e.g., person, product, etc.) date/time stamps, current camera location, previous camera locations, directional data, product cost, product shrinkage, as well as others.

One example of an intelligent video surveillance system 105 is described in commonly-owned, co-pending U.S. patent application Ser. No. 10/706,850, "Method And System For Tracking And Behavioral Monitoring Of Multiple Objects Moving Through Multiple Fields-Of-View," the entire disclosure of which is included by reference herein. In accordance with the present invention, the alert/search processing module 120 is augmented with additional inputs for receiving data from external sensor networks 110 using various forms of tracking and data capture, such as POS, RFID and EAS systems.

The video surveillance system 105 of the present invention includes multiple input sensors 125 that capture data depicting the interaction of people and things in a monitored environment. The sensors 125 can include both cameras (e.g., optical sensors, infrared detectors, still cameras, analog video cameras, digital video cameras, or any device that can generate image data of sufficient quality to support the methods described below) and non-video based sensors (e.g., RFID base stations, POS scanners, inventory control systems).

In accordance with various embodiments of the invention, the external sensor networks 110 collect and route signals representing the sensor outputs to the alert/search processing module 120 of the video surveillance system 105 via one or more standard data transmission techniques. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways such as Ethernet or wireless networks, direct serial or parallel connections, USB, firewire, Bluetooth, or proprietary interfaces. The system 100 can be configured as a "star-shaped network" in which each sensor 125 is individually connected to the alert/search module 120, or in some cases, the sensor network 110 may have a more generic topology including switches, routers, and other components commonly found in computer networks. In some embodiments, the sensors 125 are capable of two-way communication, and thus can receive signals (to power up, sound an alert, etc.) from the video surveillance system 105.

In some embodiments, the system 100 includes a video storage module 150 and a rules/metadata storage module 155. The video storage module 150 stores video captured from the video surveillance system 105. The video storage module 150 can include VCRs, DVRs, RAID arrays, USB hard drives, optical disk recorders, flash storage devices, image analysis devices, general purpose computers, video enhancement devices, de-interlacers, scalers, and/or other video or data processing and storage elements for storing and/or processing video. The video signals can be captured and stored in various analog and/or digital formats, including, as examples only, Nation Television System Committee (NTSC), Phase Alternating Line (PAL), and Sequential Color with Memory (SECAM), uncompressed digital signals using DVI or HDMI connections, and/or compressed digital signals based on a common codec format (e.g., MPEG, MPEG2, MPEG4, or H.264).

The rules/metadata storage module 150 stores metadata captured from the video surveillance system 105 and the external sensor networks 110 as well as rules against which the metadata is compared to determine if alerts should be triggered. The rules/metadata storage module 155 can be implemented on a sever class computer that includes application instructions for storing and providing alert rules to the alert/search processing module 120. Examples of database applications that can be used to implement the video storage module 150 and/or the rules/metadata storage module 155 the storage include MySQL Database Server by MySQL AB of Uppsala, Sweden, the PostgreSQL Database Server by the PostgreSQL Global Development Group of Berkeley, Calif., or the ORACLE Database Server offered by ORACLE Corp. of Redwood Shores, Calif. In some embodiments, the video storage module 150 and the rules/metadata storage module 155 can be implemented on one server using, for example, multiple partitions and/or instances such that the desired system performance is obtained.

A variety of sensor networks 110 can provide data to the system 100. For example, POS networks involve of a number of stations (e.g., cash registers, scanners, etc.) connected to a network and when activated, sensors in the stations transmit a customer's transaction information (product, price, customer ID, etc.) as well as the status of the cash drawer (e.g., open or closed) to the network. Similarly, EAS networks typically include a number of pedestals situated near the exits of a retail store that sense the presence of activated EAS tags placed on high-value (or in some cases all) products. When the presence of a tag is detected, the pedestal transmits information over the network to a central location. Many commercial buildings also employ security systems that sense the opening and closing of doors and use "card-swipe" systems that require employees to swipe or present identification cards when entering or leaving the facility. In accordance with the present invention, some or all of these sensor-based monitoring systems 110 are integrated with the video surveillance system 105 to enhance its capabilities and accuracy. Of course, the above list of sensor types is not exhaustive, and merely provides examples of the types of sensor networks 110 that can be accommodated.

In one non-limiting example, the sensor network 110 includes an RFID subsystem that itself includes transmitters (also referred to as "base stations" or "stations") that interact with transponders placed on objects being tracked by the surveillance system 100. The stations intermittently (every $n^{th}$ millisecond, for example, where n is a selected integer) transmit RF energy within some effective radius of the station. When a transponder enters this effective radius, the RF energy "wakes up" the transponder, which then interacts therewith to impart an identification signal to the station. The signal typically includes various information about the object to which the transponder is attached, such as a SKU code, a source code, a quantity code, etc. This data is augmented with information from the transmitter (e.g., a transmitter ID and date/timestamp), and can be saved as a unique record. By placing multiple transmitters about an area (throughout a store or warehouse, for example), the RFID subsystem can be used to determine the location and path of an object carrying the RFID tag using the coordinates of the transmitters and the times they interacted with the transponder.

In some embodiments, the alerts created by the alert/search processing module 120 can be transmitted to output devices 145 such as smart or dumb terminals, network computers, wireless devices (e.g., hand-held PDAs), wireless telephones, information appliances, workstations, minicomputers, mainframe computers, or other computing devices that can be operated as a general purpose computer, or a special purpose hardware device used solely for serving as an output devices 145 in the system 100. In one example, security officers are provided wireless output devices 145 with text, messaging, and video capabilities as they patrol a monitored environment. As alerts are generated, messages are transmitted to the output devices 145, directing the officers to a particular location. In some embodiments, video can be included in the messages, providing the patrol officers with visual confirmation of the person or object of interest.

In some embodiments, the output devices 145 can also include global information services (GIS) data. In such implementations, maps and/or floorplans (either actual photographs or graphical repreesntations thereof) are combined with iconic and textural information describing the environment and objects within the environment. For example, security personnel working at an amusement park can be provided with wireless, hand-held devices (such as the SAMSUNG SCH i730 wireless telephone) and which are capable of rendering still and/or video graphics that include a map of the park. Using GPS coordinates obtained via similar devices (or, in some cases, RFID base stations located throughout the park), the locations of various displays, personnel, vendors, or groups can be determined and displayed concurrently with the park map.

As the system 100 analyzes movements of park visitors and other objects, the alert/search processing module 120 uses metadata received from the ideo surveillance system 115 and the external sensor networks 110 to determine if one or more rules are met, and if so, generates alarms. As one example, an object ID associated with a park visitor and a stroller ID associated with a child's stroller rented by the visitor can be linked using manual association and/or automatic techniques (based, for example, on repeated detection of the two objects in close proximity). If an RFID sensor determines that the stroller is at one location within the park, and the video surveillance system determines the park visitor is outside some acceptable range of the stroller, an alert is generated.

The alert is then transmitted to the security personnel, who, using the GIS-enabled devices, can see the location of the stroller and the location of the park visitor superimposed on the park map.

In some embodiments, additional data can be added to the display, such as coloring to represent crowd density or a preferred path, to further facilitate quick movement of the park personnel to a particular locations. Color enhancements can also be added to indicate the speed at which an object is moving, or the degree of threat the object poses to the monitored environment. In some cases, updates can be transmitted to the display to provide a real-time (or near-real-time) representation of the events and objects being monitored.

Figure 2:
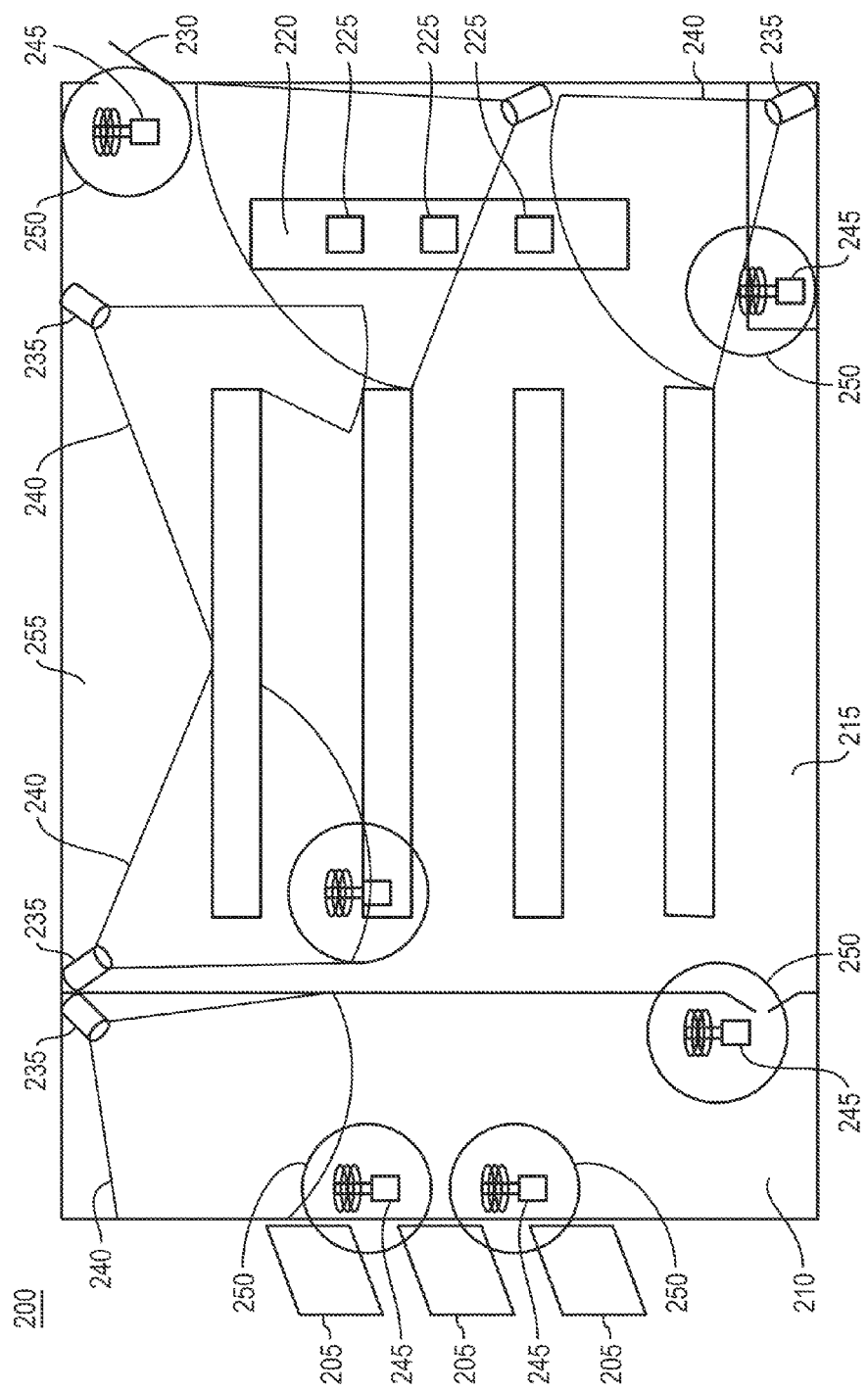
FIG. 2 schematically depicts a monitored environment in which various embodiments of the invention can be implemented.

Referring to FIG. 2, an environment 200 being monitored by the surveillance system of FIG. 1 includes multiple areas of interest—multiple loading docks 205, a supply area 210, a retail area 215, a checkout area 220 (including one or more point-of-sale devices 225) and an exit 230. To monitor the various activities that occur in the environment 200 (deliveries, stocking, purchasing, etc.) a video surveillance sub-system includes multiple cameras 235, each having a field of view 240, and multiple RFID stations 245, each having an operational radius 250 within which its RF signals are effective. In some cases, the fields of view 240 and the operational radii 250 are exclusive of each other—i.e., there is no overlap. In other instances, an area being monitored may be covered by one or more fields of view 240 and an operational radius 250 in such a manner that an object in this area can be detected by both subsystems. However, in many cases, the environment 200 includes multiple ineffective areas 255—often referred to as "dead zones"—in which neither the video subsystem nor the RFID subsystem is able to obtain information about activities in that area. The dead zones may be the product of poor implementation planning, changes in the physical layout of the monitored environment 200 (e.g., a new wall or shelving unit is built), budgetary limitations, or in some cases, malfunctioning cameras 235 and/or RFID stations 245.

By combining the video data supplied by the video subsystem and the locational data supplied by the RFID subsystem, and using the methods described below, the problem of dead zones can be addressed, in fact, by deriving a complete timeline of a person and/or product's path through the environment 200. Furthermore, unique identifiers can be assigned to objects, people and events within the environment and the events captured by the surveillance system can be compared to rules, which, if met, trigger alarms and/or predict behavior. The term "objects" is used in its most general sense to represent the various elements that interact with each other in the environment 200, such as people (either specific individuals or people in general), merchandise, areas (exits, restrooms, etc.), cameras, sub-regions of cameras, and RFID stations.

Rules can be established relative to one object or numerous objects. As an example, a rule can test for a behavior indicative of theft by comparing a person's behavior around particular products with RFID data indicating that a high quantity of one of these products is removed from a shelf within a short period of time. As another example of a compound rule using data from both the video and RFID subsystem, an alert can be created to test for theft when a product is removed from a shelf (based on an RFID signal), is associated with a particular person (based on his or her video image in the vicinity of the shelf at the same time), and is again recognized by an RFID station at the exit of the store but no image of the person visiting a checkout counter has been recorded. In some embodiments, the data can be further combined with point-of-sale data, such that products "seen" leaving through the exit (whether by video, RFID, or both) have been previously scanned by, for example, a SKU scanner at a checkout.

Figure 3:
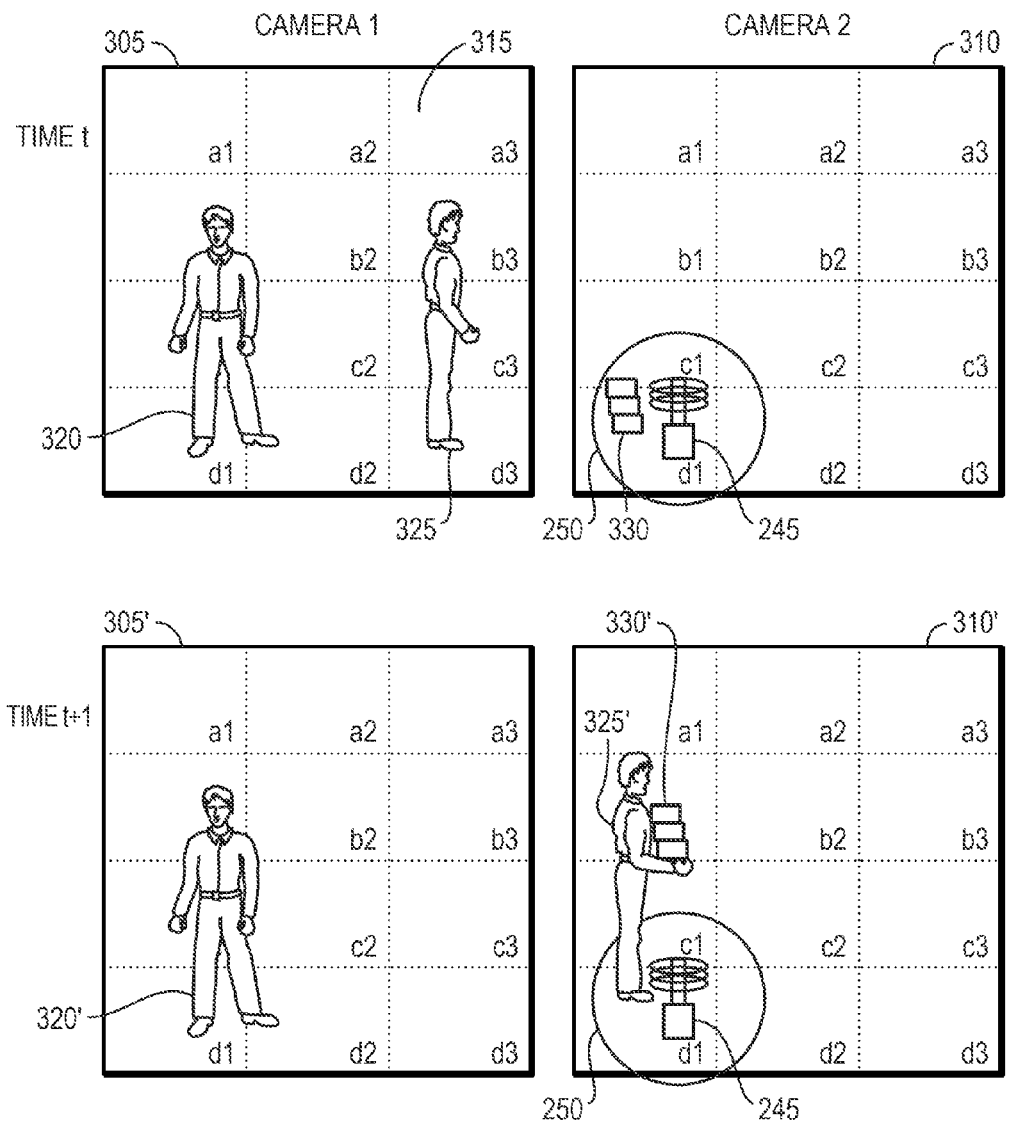
FIG. 3 illustrates scenes captured using the surveillance system according to one embodiment of the invention.

FIG. 3 illustrates one possible arrangement of cameras and RFID stations for tracking objects in accordance with various embodiments of the invention. A first camera provides a video signal representing a first scene 305 at a first time t, and the same scene 305' at a second time t+1. A second camera provides a video signal representing a second scene 310 at time t and the same scene 310' at time t+1. In addition, RFID station 245 is within the field of view of the second camera, and therefore appears in the scene 310.

In some embodiments, the fields of view of the cameras are segmented into sub-regions 315. While illustrated as having twelve sub-regions (three columns×four rows), the sub-regions can be of any number and size, ranging from one sub-region representing the entire field of view to individual pixel-level sub-regions. By segmenting the field of view into sub-regions, the surveillance system can track objects with greater granularity, and effectively predict a "next camera" or "next sub-region" into which an object may travel, as described below.

For example, and still referring to FIG. 3, a person is shown standing in a particular location in scene 305. Visual object 320 represents the person and is associated with camera 1, sub-region dl at time t. Although the video representation spans three sub-regions, the person is, in this example, assigned to one sub-region (namely, dl). Where an object spans multiple sub-regions, rules can be applied to determine the particular sub-region to which the object should be assigned. As one non-limiting example, the pixel count of the object assigned to each sub-region can be determined, and the object assigned to the sub-region having the highest pixel count. In other embodiments, the assignment may be spatial—e.g., the object is always assigned to the "lowest" sub-region (i.e., the sub-region closest to the ground or floor) in which a portion of the person appears. In other embodiments, the objects can be assigned to multiple sub-regions.

By segmenting the fields of view into sub-regions, the granularity of the video surveillance subsystem can be enhanced without adding cameras. For example, one camera may provide video surveillance of both the check-out area and exit of a retail establishment. Without segmentation, a rule based on a person or product exiting the establishment without visiting a checkout counter would not be viable, as it would be difficult to discern the location of the person within the frame without the use of complex coordinate-based reference systems. However, with segmentation, a person walking through a sub-region containing the store exit without walking through a sub-region assigned to a point-of-sale would trigger such a rule.

The invention further provides for creating associations between products identified using video and/or RFID and people identified using video. By augmenting the video surveillance sub-system with RFID (including an RFID station at the exit), the details of the product (SKU, serial number, etc.) can be captured and checked against recent purchases and items recently removed from stock shelves. Still referring to FIG. 3, person 325 is located at sub-region d3 of camera 1's field of view at time t. At the same time t, product 330 is known to be at a particular location based on signals received at RFID station 345, which is also known to be located in sub-region dl of camera 2's field of view. At time t+1, person 325 has moved to within the view of camera 2 (and is now represented by image 325'), and picked up product 330, (now represented by image 330'). The product 330' is out of operational range 250 of RFID station 345, but still within the field of view of camera 2.

Based on historical data, motion vectors, or other probabilistic analysis, an inference can be drawn that the combination of images 325' and 330' represent both person 325 and product 330. In some embodiments, RFID tag numbers associated with a product can be linked to video objects tracked using the video surveillance sub-system as characteristics of the objects. The association can be one-to-one, one-to-many, or many-to-many. For example, a person represented as a video object in the video surveillance sub-system may be carrying multiple products each with an RFID tag, while a group of people might be associated with a single RFID tag (while they are standing together). The set of tags associated with the tracked object may provide extra discriminatory hints when the object shows up on different cameras.

For example, a series of RFID records received from an RFID station can be represented as shown in Table 1:

TABLE 1

Sample RFID Data

| Time | Product | StationID | Distance |
|---|---|---|---|
| t | 00001 | 0113FF | 0.023 |
| t + 1 | 00001 | 0113FF | 0.023 |
| t + 2 | 00001 | 0113FF | 0.023 |
| t + 3 | 00001 | 0113FF | 0.046 |
| t + 4 | 00001 | 0113FF | 0.150 |

Based on the data above, it can be inferred that product 00001 was stationary for some period of time, i.e., it remained at a constant distance from the station for three time periods. However, at some time between t+2 and t+3, the product started moving away from the station. In some embodiments, directional information is also included with the RFID data, facilitating a determination of both speed and direction of movement.

Similarly, a series of video data records received from the video surveillance sub-system can be represented as shown in Table 2:

TABLE 2

Sample Video Data

| Time | ImageID | CameraID | SubRegionID |
|---|---|---|---|
| t | 0000X | 10002 | A2 |
| t + 1 | 0000X | 10002 | A2 |
| t + 2 | 0000X | 10002 | A2 |
| t + 3 | 0000X | 10002 | A3 |
| t + 4 | 0000X | 10003 | A1 |

Based on the data above, it can be inferred that the object identified as image 0000X was stationary for some period of time, i.e., it remained at the same sub-region of the same camera for three time periods. However, at some time between period t+2 and t+3 the image moved, and was recorded by camera 10002 at sub-region A3 at time t+3, and subsequently by camera 10003 at sub-region A1 at time t+4. The direction and speed of the object can be determined using various techniques known in the art, such as motion vector and pixel-based analysis.

Using either manual or automated means, and using the sample data above as an example, an association can be made between RFID station 0113FF and sub-region A2 of camera 10002. For example, in the case of manual association, a software application allowing a user to specify associations in a form such as {0113FF:10002.A2} provides a mechanism by which the RFID stations and camera sub-regions can be associated with each other in a one-to-one, one-to-many, and/or many-to-many fashion based on known locational overlap(s). Automated association can be achieved, for example, through heuristic rules and machine-learning processes, whereby historical data is analyzed for object states or paths that are common to a camera (or a sub-region of a camera) and an RFID station. As an example, if an RFID station detects the placement of a product at a certain time, and independently the placement of a new object is detected within a sub-region of a camera's field of view, an association between the RFID station and the sub-region can be inferred. Initially, the inferences are likely to be weak (i.e., a low probability of being correct in a system with numerous stations and cameras), but as additional data is gathered over time, the strength of the associations will increase to an acceptable probability. The two methods (manual and automated) may be combined in some cases where, for example, an initial set of associations is specified, but as stations are moved or cameras are realigned, the system changes the associations accordingly. Unlike conventional implementations of multiple-modality monitoring systems, the methods described above eliminate the need for time-consuming (and often repeated) calibration steps wherein personnel manually assign a particular sensor with a camera.

Figure 4:
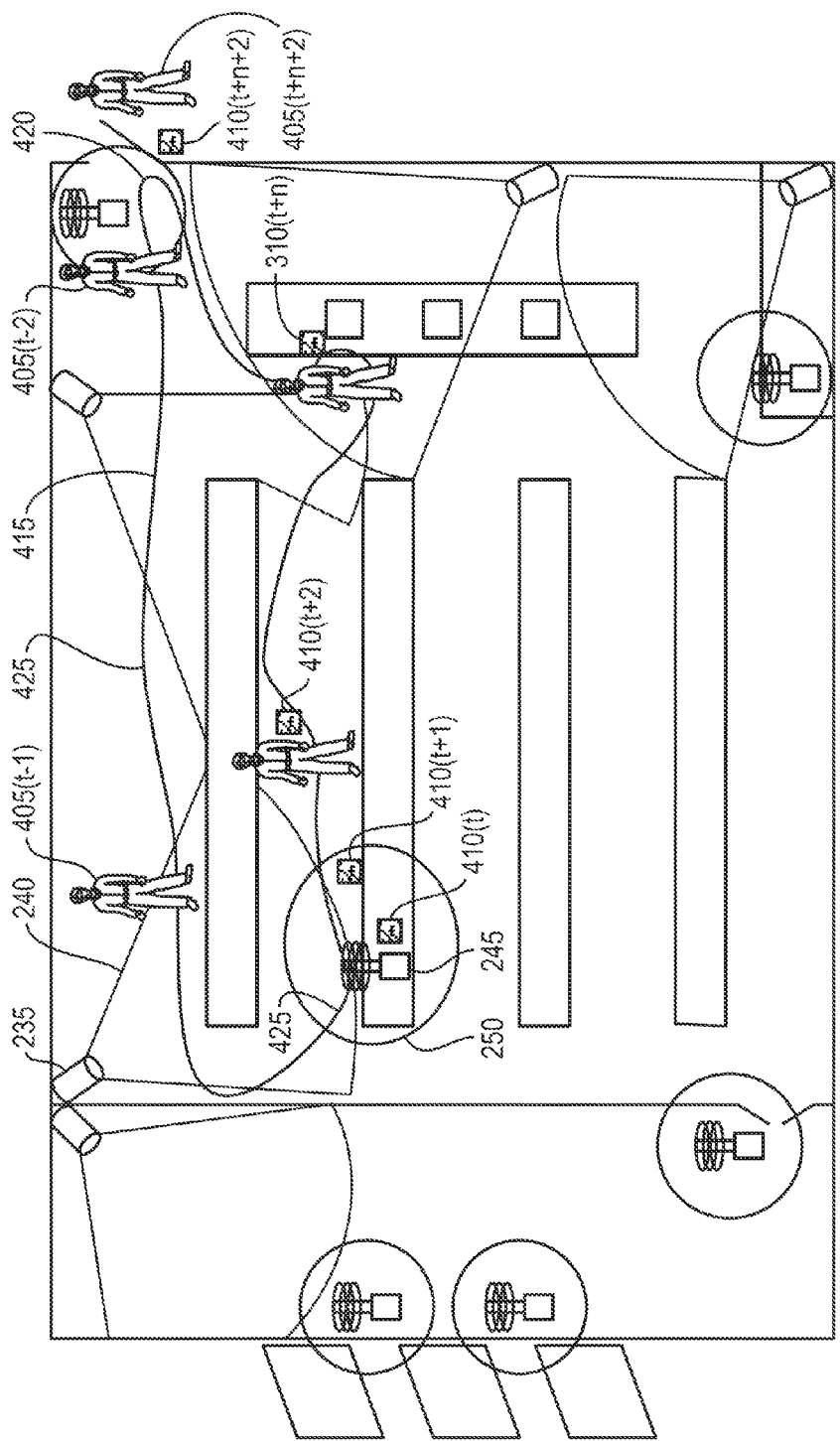
FIG. 4 schematically depicts a person's path through the monitored environment of FIG. 2.

In some embodiments, the fields of view do not overlap, and therefore gaps can exist in the chronological path of a person or product as it travels through the environment. FIG. 4 illustrates both the physical path and timeline of a person 405 purchasing product 410 at time t. Person 405 enters the store at time t−2 and traverses a path. Along certain portions of the path (e.g., portion 415), person 405 is in view of a video surveillance camera. Along other portions of the path (portion 425, for example), he is out of sight of any camera. Independently of person 405, product 410 is displayed for sale and is in both the field of view 240 of camera 235, and within the operational radius 250 of RFID station 245. As person 405 moves about the store, he disappears for some period of time as he moves out of the field of view of a first camera, and reappears at time t−1 as he enters the field of view of camera 235. At time t, person 405 picks up product 410 and moves long the path, eventually taking product 410 outside the range of RFID station 245 between time t+1 and time t+2. Person 405 travels toward the check-out counter where his presence is recorded by one or more cameras. In some embodiments, the hand-off from one camera to another can be predicted by determining a camera's (or a sub-region's) adjacencies, as described in greater detail below.

As person 405 purchases product 410 at, for example, a cash register with a SKU scanner, a record is created of the purchase. In some embodiments, the purchase record can be compared to the RFID data depicted above to determine if, for example, the product(s) 410 that person 405 selected from the shelf matches the product(s) 410 being purchased. As person 405 travels toward the exit, the product 410 is within the effective range of another RFID station, thus creating additional RFID data against which rules can be applied. As one non-limiting example, a "shoplifting" rule can be triggered if product 410 is first detected as moving away from an RFID station in proximity to its normal shelf location, and later detected exiting the store, but is never detected by an RFID station at a check-out area or scanned by a point-of-sale device.

As another example, rules based on data received from the RFID sub-system can also trigger a "stuff zone" alert. A "stuff zone" is an area of a store where thieves hide product that they plan to steal later. If, for example, an RFID station detects product being placed onto a shelf where it does not belong, or near other often-stolen products, an alert can be triggered. The alert can then be combined with other alerts, e.g., a video alert that first detects product being placed on a shelf, and/or that starts following a suspect about the area being monitored.

As mentioned above, gaps in video and/or RFID coverage areas can be overcome by knowing or inferring which stations and cameras have operational areas adjacent to a device that is currently detecting an object being tracked. A device's adjacencies generally include other cameras or RFID stations that are in some way nearby to that device. "Nearby" can, for example, mean those cameras toward which an object will most likely travel, based on the movement of the object. Two devices may also be considered adjacent if a person or object recorded by one camera or RFID station is likely to appear (or is appearing) on the other device within a short period of time. The period of time may be instantaneous, or in some cases following a delay. In some embodiments, users manually specify adjacencies, thereby creating adjacencies which would otherwise seem arbitrary.

Adjacencies can also be determined based on historical data, either real, simulated, or both. In one embodiment, user activity is observed and measured, for example, determining which camera views or RFID station ranges an object is likely to travel to based on prior object movements. In another embodiment, camera images are directly analyzed to determine adjacencies based on scene activity. In this case, the scene activity is choreographed or constrained in some way, using, for example, training data. In some cases, adjacencies may be specified, either completely or partially, by the user. In some embodiments, adjacencies are computed by continuously correlating object activity across multiple camera views as described in commonly-owned co-pending U.S. patent application Ser. No. 10/706,850, entitled "Method And System For Tracking And Behavioral Monitoring Of Multiple Objects Moving Through Multiple Fields-Of-View," U.S. patent application Ser. No. 10/660,955, entitled "Computerized Method And Apparatus For Determining Field-Of-View Relationships Among Multiple Image Sensors" and U.S. patent application Ser. No. 11/388,759, entitled "Intelligent Camera Selection and Object Tracking," each of which is included by reference in their entirety herein. As described in the above-referenced documents, strong correlations between cameras and/or camera sub-regions tend to imply adjacencies, and in addition to heuristically determined adjacencies, users can manually add or delete adjacencies if deemed appropriate.

Adjacencies may also be specified at a granularity finer than an entire scene. Sub-regions within a video data pane can be considered "adjacent" to sub-regions of other cameras or to operational radii of RFID stations. The adjacent views may be different in terms of size and/or shape, e.g., what appears as a sub-region in one view may be the entirety of an adjacent view, or a sub-region of a camera's field-of-view may have no adjacent camera views, but one or more adjacent RFID stations.

In most cases, a camera (or a sub-region of the camera's field of view or RFID station as described above) has multiple adjacencies, and the adjacencies can be ordered according to a relevance measurement. Relevance may be measured, for example, by calculating the probability that a person or object in the video data window or within the effective area of the RFID station will transition to a particular camera or RFID station adjacent to the primary camera or RFID station, or to a combination of the two. Each probability may considered equally, or may instead be weighted based on the amount of data used to calculate the probabilities, the correlation among the probabilities, or other such measure.

Figure 5A:
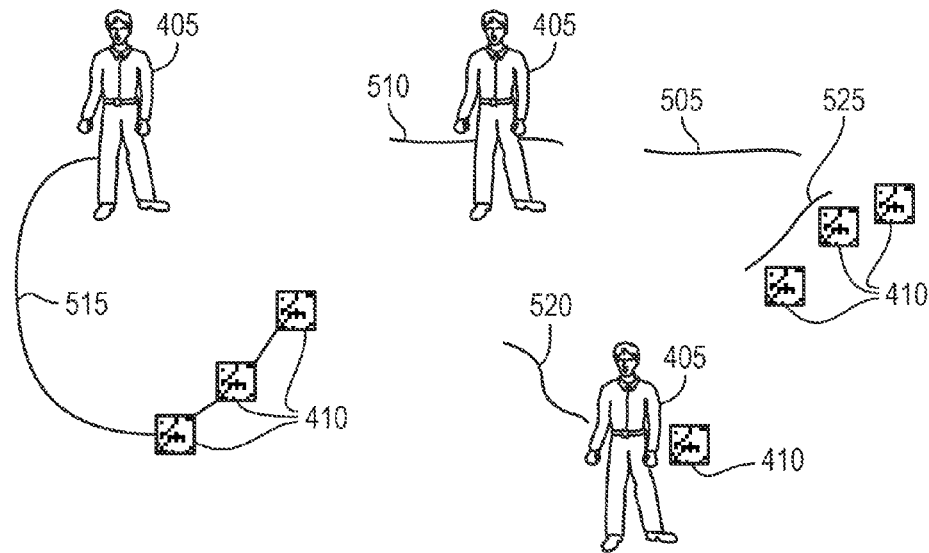
FIG. 5A further depicts a person's path through the monitored environment of FIG. 2.
Figure 5B:
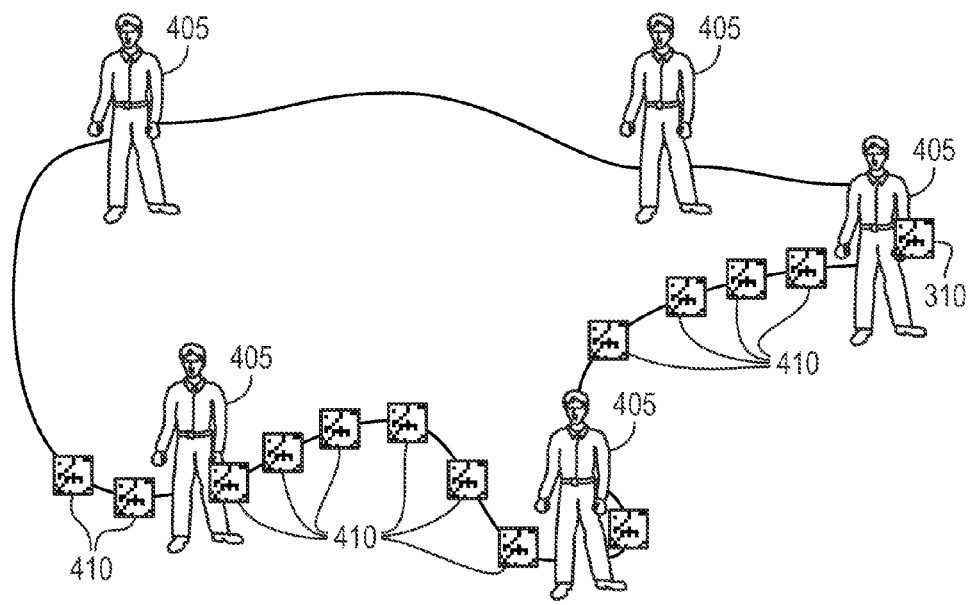
FIG. 5B shows an annotated path though a monitored environment in accordance with one embodiment of the invention.

Referring to FIGS. 5A and 5B, the path of person 405 and product 410 through a monitored environment (as illustrated in FIG. 4) can be depicted as a series of sub-paths 505, 510, 515, 520, and 525, each of which is determined based on video data, RFID data, or both. For example, as person 405 enters a store, he is first noticed and assigned an OBJECTID at path 505 when he enters the field-of-view of a first camera. As he continues on his path, the camera loses sight of person 405, due to incomplete coverage of the area, malfunction, physical attributes of the space (e.g., temporary displays blocking camera views) or for other reasons. An image of person 405 is reacquired at sub-path 510 by another camera, or, in some cases, at a different sub-region of the same camera. As the person nears product 410, he remains in the field of view of the camera, and in addition an RFID station tracks the movement of product 410 as it is carried away by person 405. Once person 405 and product 410 are out of range of the camera and the RFID station, no data is received for either. Person 405 is reacquired on video at sub-path 525 as he purchases product 410, and product 410 is recognized by the point-of-sale apparatus upon checkout and again by and RFID station at the exit of the store. Absent the ability to combine video, RFID and point of sale data, as well as the ability to predict movements of objects throughout a monitored environment, what results is a disparate set of sub-paths that do not represent the complete path of the objects over time.

Using the techniques described above relating to associations between RFID data, point-of-sale data, and video data, as well as the methods of determining likely paths based on adjacencies, the complete path 530 of person 405 and product 410 can be inferred as shown in FIG. 5B. Once complete, the various rules regarding theft prevention, child safety, and others can be applied and, if triggered, provide adequate warnings to the appropriate personnel.

In some embodiments, these warnings may be real-time warnings to store security personnel as they patrol the store, using, for example, wireless hand-held devices that are capable of displaying both data (e.g., "THEFT ALERT OF PRODUCT XYZ AT EXIT") and video (e.g., a picture of a suspected shoplifter or of a lost child).

Additional implementations and exemplary deployments will now be described.

Alert and Search Processing

Return fraud (i.e., fraud in which a stolen product is fraudulently returned for cash) is a concern for many retail establishments. The following "employee return fraud" example illustrates one representative application in which integration of the video surveillance and sensor network monitoring systems provides benefits beyond those realized from using each independently of the other. In retail return fraud, someone (either a customer or an employee) attempts to return a previously-stolen product to the store in an attempt to convert it to cash. In other cases, the product is taken directly from a store shelf and immediately returned using a fraudulent receipt. Because many employees are trained to detect suspicious activities, they can often detect the fraud and decline the return.

However, the vast majority of returns are not fraudulent, and it is especially difficult to prevent return fraud using conventional systems when a store employee is involved. Watching a POS data stream for return transactions is one approach for detecting such behavior, but this technique is time-consuming and resource intensive, and the POS data does not indicate the presence or lack of a customer at the time of the transaction. But by combining the POS data with a video surveillance system that can detect whether a customer is present at the checkout counter, the integrated system can provide a much more accurate indication of whether a return is fraudulent or genuine.

In particular, employee return fraud is generally characterized by processing of a fraudulent return at a POS without a customer being present. Thus, two pieces of information are generally needed to automatically detect the fraud: (1) whether a possibly fraudulent return was (or is being) processed and (2) whether a customer is present at the point of sale. Video surveillance systems or POS networks cannot provide a complete and accurate answer to both questions alone. For example, the video surveillance system generally cannot determine if the transaction being processed is a return, or even if a transaction is being processed at all. POS networks can record return transactions occurring in a store, and some POS systems include special fraud-detection filters that can identify certain transactions as being more likely to be fraudulent than others. However, even with advanced fraud detection, conventional POS systems generate numerous false positives, and cannot distinguish employee return fraud from customer return fraud. An integrated system combining data from both video and POS systems, on the other hand, can perform both checks, and using the rule-based approach described herein can detect when an employee return fraud event has occurred, or in some cases is currently occurring in embodiments using real-time rule checking.

Figure 6:
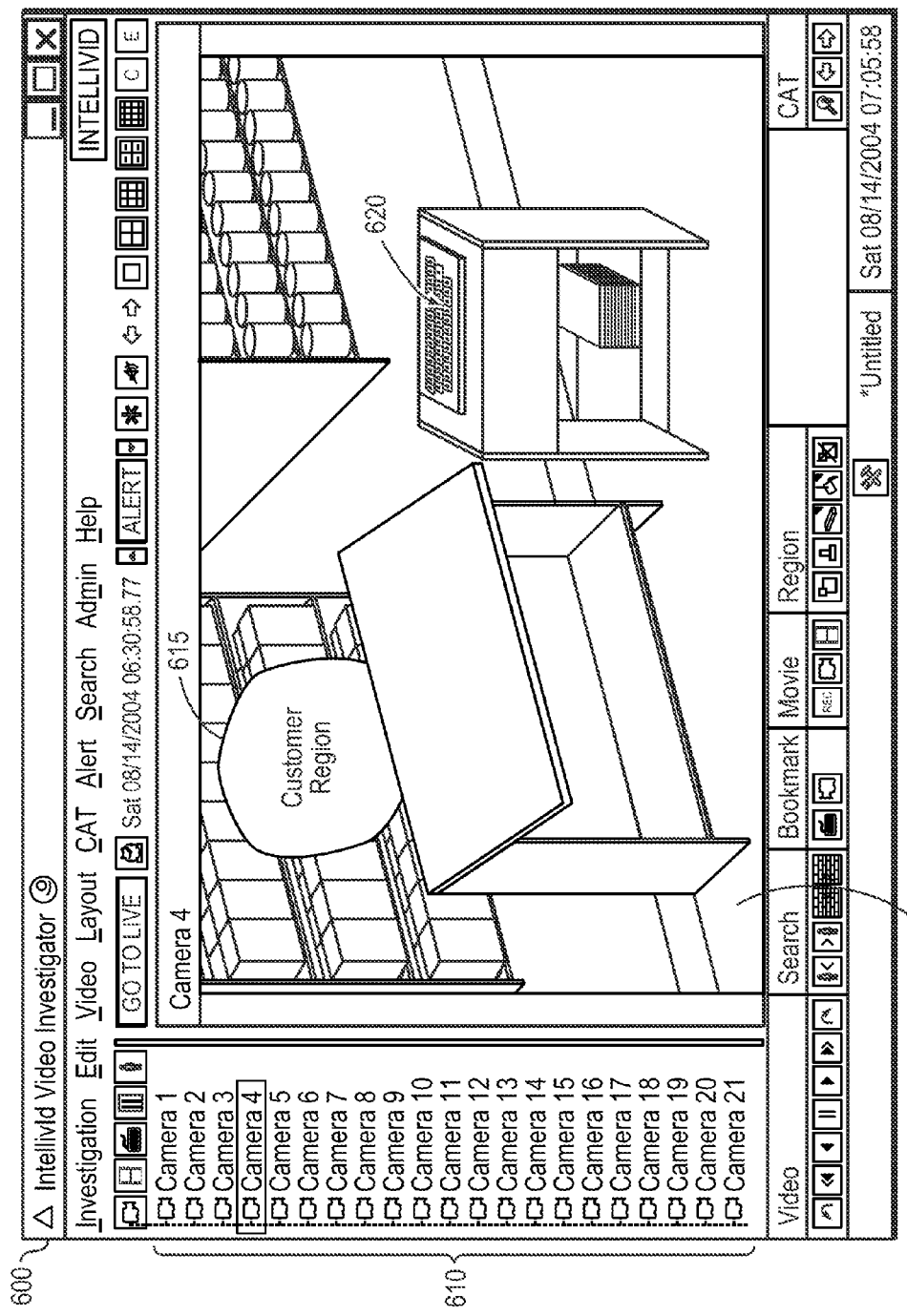
FIG. 6 is a representation of a user interface for viewing and identifying suspicious behavior according to one embodiment of the invention.

Referring to FIG. 6, for example, a video surveillance system can detect the presence or absence of people in a video image 600 based on one or more cameras 605 that include both a customer region 615 and a POS station 620. By marking regions of the video as "customer regions," the system can detect the presence of customers (and distinguish them from non-customers who are generally behind the counter in a different region of the camera's field of view).

For example, the POS system recognizes that a return has occurred, and the information about the return (e.g., the time of the transaction, the ID of the POS station, and possibly the details of the transaction) is sent to the alert processing module of the video surveillance system. The alert processing module applies a number of rules that encode the alerts of interest, and in the case of employee return fraud, a rule can exist for each POS station where returns are processed. When the POS data arrives at the alert processing module, application of one or more rules determines if an alert should be generated. In some embodiments, the rules are stored in a separate data storage module, and can be updated periodically.

One possible form for the rules uses Boolean logic. Using the fraudulent employee return as an example, a rule can be expressed as "if ((RETURN PROCESSED on POS #XXX) and (not (OBJECT PRESENT in region #YYY))) then ALERT." Here "XXX" refers to a unique ID number assigned to each POS station, and "YYY" refers to a unique ID number assigned to the customer region corresponding to the POS station. The definition of the rule, and hence the association of the POS station ID with the region ID, can be formulated manually by an end user of the system, or automatically through various machine-learning and heuristic techniques.

In general, an alert rule combines primitive events together using Boolean logic (for example, AND, OR, NOT operators). A primitive event is one that can be detected on a given sensor network. For example, primitive POS events include "RETURN PROCESSED," "CASH DRAWER OPEN," "ITEM zzz PURCHASED," etc. Primitive video system events include "OBJECT PRESENT," "OBJECT MOVING," "NUM OBJECTS>N," etc. Primitive security system event include "CARD #123456 SWIPED," "DOOR OPEN," "MOTION DETECTED," etc. One example of a primitive EAS event is "TAG DETECTED."

Primitive events can be combined together with Boolean logic to generate alert expressions, which can be arbitrarily complex. A rule may consist of one or more alert expressions. If the entire expression evaluates to "true," then an alert is generated. For example, consider an alert to detect if two people leave a store when an EAS event is detected. The primitive events are "TAG DETECTED" and "NUM OBJECTS>2." If both are true, then the alert fires. So the compound expression is "(TAG DETECTED on EAS #123) and (NUM OBJECTS>2 in region #456)." As before, unique ID numbers are used to relate the particular EAS pedestal to a region of interest on the appropriate camera.

As another example, an alert can be triggered based on detecting two people entering a restricted access door using one credential (commonly referred to as "piggybacking"). The alert rule is similar to the above EAS alert rule: "if ((DOOR OPENED on DOOR #834) and (NUM OBJECTS>2 in region #532)) then ALERT."

Similar to detecting employee return fraud, it is often useful to know when the cash drawer of a POS station is opened and a customer is not present. Such event is often indicative of employee theft. As an example of a more complex rule, detection of this event can be combined with the employee return fraud rule so that both cases can be detected with one rule: "if (((RETURN PROCESSED on pos #XXX) or (CASH DRAWER OPENED on pos #XXX)) and (not (OBJECT PRESENT in region #YYY))) then ALERT."

The rules described above represent examples of rules that, in combination, constitute a full alert rule language. For example, rules may include temporal information about events (e.g., alert if an event occurs for some period of time), sequential information (e.g., alert if this event follows that event), the absence of an event (e.g., a sale event occurs and no customer is present), or any other combination of primitive events. In summary, events can be detected from a variety of sensors, and alert rules may be defined to act on various types of events, regardless of form, syntax, or structure.

Although the alerts described above are expressed as a real-time function of the surveillance system, it is also valuable to know if an alert condition was triggered at some time in the past. By storing meta-data regarding the POS, EAS, RFID and video data, the system can scan the stored data retroactively, and the same algorithms can be applied as used in the real-time case to search for suspicious events that occurred in the past.

Child Safety

In some cases, parents shopping at a retail establishment (a store or a mall, for example) want additional security assurances regarding their children. In such instances, an RFID tag is assigned to a child when she enters the store so that she can be quickly located if lost. In some cases, RFID tags are placed on both the parent and child to detect separation using the combination of video and RFID data, and the system can sound an alarm if the child wanders too far away from the parent.

Slip and Fall

Rules can also be used create alerts that a potentially dangerous state exists requiring immediate attention. For example, if a video subsystem detects something falling into an aisle, the RFID sub-system can be used to identify particular attributes of the product (e.g., it is spillable, glass, toxic, etc.) and alert the appropriate personnel.

Forensic Operation

Other valuable information that can be gleaned from the combination of video and RFID data is the ability to search historical data for purchases of a product and request a gallery of video images of people who bought the product to better understand customer demographics for marketing purposes. For example, by looking at just the RFID data stream, statistics about how many things were bought and when can be determined. Combining the RFID data with data from the video sub-system that can discern properties of people from the video (e.g., race, gender, age, etc.) allows shopper behavior to be observed and analyzed.

General Considerations

For embodiments in which the methods are provided as one or more software programs, the program may be written in any one of a number of high level languages such as FORTRAN, PASCAL, JAVA, C, C++, C#, or BASIC. Additionally, the software can be implemented in an assembly language directed to the microprocessor resident on a target computer, for example, the software may be implemented in Intel 80x86 assembly language if it is configured to run on an IBM PC or PC clone. The software may be embodied on an article of manufacture including, but not limited to, a floppy disk, a hard disk, an optical disk, a magnetic tape, a PROM, an EPROM, EEPROM, field-programmable gate array, or CD-ROM.

In these embodiments, the software may be configured to run on any personal-type computer or workstation such as a PC or PC-compatible machine, an Apple Macintosh, a Sun workstation, etc. In general, any device can be used as long as it is able to perform the functions and capabilities described herein as the particular type of computer or workstation is not central to the invention.

What is claimed is:

1. A system comprising:
a video surveillance subsystem comprising a plurality of cameras each having a field of view, each field of view comprising a plurality of sub-regions;
a radio-frequency identification subsystem comprising a plurality of radio-frequency stations, each radio-frequency station configured to detect radio-frequency identification tags within a respective operational radius; and
an association module in communication with the video surveillance subsystem and the radio-frequency identification subsystem, the association module for inferring associations among one or more of the sub-regions and one or more of the operational radii, wherein inferring the associations comprises:
determining a first probability that a first one of the sub-regions is associated with a first one of the operational radii based on a detection of a tracked object in both the first sub-region and the first operational radius at a first time; and
determining a second, higher probability that the first sub-region and the first operational radius are associated based on a detection of a tracked object in both the first sub-region and the first operational radius at a second, later time.

2. The system of claim 1, wherein the video surveillance subsystem is configured to capture visual representations of objects moving among the fields of view of the cameras.

3. The system of claim 1, wherein the radio-frequency identification subsystem is configured to capture spatial information associated with objects moving among the operational radii of the radio-frequency stations.

4. The system of claim 1, wherein, for an association between a particular sub-region and a particular operational radius, at least one of the following is unknown: (i) a location of the camera having the field of view comprising the particular sub-region, and (ii) a location of the radio-frequency station associated with the particular operational radius.

5. The system of claim 1, wherein at least one of the associations is inferred based at least in part on repeated detection of tracked objects in both a particular sub-region and a particular operational radius at substantially the same time.

6. The system of claim 1, further comprising a tracking module for chronologically representing physical locations of track objects based on data received from the video surveillance subsystem and the radio-frequency identification subsystem.

7. The system of claim 6, wherein the video surveillance subsystem and the radio-frequency identification subsystem operate within a region, the region comprising at least one ineffective area outside the fields of view of the cameras and the operational radii of the radio-frequency stations.

8. The system of claim 7, wherein the tracking module infers a location of a tracked object as the tracked object passes through at least one ineffective area.

9. The system of claim 7, wherein the tracking module infers a next camera location for a tracked object as the tracked object passes through an ineffective area, the next camera location being inferred based on a previously known location of the tracked object.

10. The system of claim 1, wherein the video surveillance subsystem and the radio-frequency identification subsystem are calibrated independently of each other.

11. A method comprising:
receiving data from a video surveillance subsystem comprising a plurality of cameras each having a field of view, each field of view comprising a plurality of sub-regions;
receiving data from a radio-frequency identification subsystem comprising a plurality of radio-frequency stations, each radio-frequency station configured to detect radio-frequency identification tags within a respective operational radius; and
inferring associations among one or more of the sub-regions and one or more of the operational radii based on the data received from the video surveillance system and the data received from the radio-frequency identification subsystem, wherein inferring the associations comprises:
determining a first probability that a first one of the sub-regions is associated with a first one of the operational radii based on a detection of a tracked object in both the first sub-region and the first operational radius at a first time; and
determining a second, higher probability that the first sub-region and the first operational radius are associated based on a detection of a tracked object in both the first sub-region and the first operational radius at a second, later time.

12. The method of claim 11, wherein the data from the video surveillance subsystem comprises visual representations of objects moving among the fields of view of the cameras.

13. The method of claim 11, wherein the data from the radio-frequency identification subsystem comprises spatial information associated with objects moving among the operational radii of the radio-frequency stations.

14. The method of claim 11, wherein, for an association between a particular sub-region and a particular operational radius, at least one of the following is unknown: (i) a location of the camera having the field of view comprising the particular sub-region, and (ii) a location of the radio-frequency station associated with the particular operational radius.

15. The method of claim 11, wherein at least one of the associations is inferred based at least in part on repeated detection of tracked objects in both a particular sub-region and a particular operational radius at substantially the same time.

16. The method of claim 11, further comprising chronologically representing physical locations of tracked objects based on data received from the video surveillance subsystem and the radio-frequency identification subsystem.

17. The method of claim 16, wherein the video surveillance subsystem and the radio-frequency identification subsystem operate within a region, the region comprising at least one ineffective area outside the fields of view of the cameras and the operational radii of the radio-frequency stations.

18. The method of claim 17, further comprising inferring a location of a tracked object as the tracked object passes through at least one ineffective area.

19. The method of claim 17, further comprising inferring a next camera location for a tracked object as the tracked object passes through an ineffective area, the next camera location being inferred based on a previously known location of the tracked object.

20. The method of claim 11, further comprising calibrating the video surveillance subsystem and the radio-frequency identification subsystem independently of each other.

* * * * *